US006324764B1

(12) United States Patent
Watkins

(10) Patent No.: US 6,324,764 B1
(45) Date of Patent: Dec. 4, 2001

(54) HEDGE TRIMMER ASSEMBLY

(76) Inventor: Steven B. Watkins, P.O. Box 1115, Walkertown, NC (US) 27051

( * ) Notice: Subject to any disclaimer, the term of this patent is extended or adjusted under 35 U.S.C. 154(b) by 0 days.

(21) Appl. No.: 09/540,511

(22) Filed: Mar. 31, 2000

(51) Int. Cl.[7] .......................... A01D 34/416; A01D 75/20
(52) U.S. Cl. ............................. 30/270; 30/286; 30/296.1; 30/347; 56/12.7
(58) Field of Search ................................ 30/276, 296.1, 30/275.4, 286, 347; 56/12.7; 172/13, 508; D8/8

(56) References Cited

U.S. PATENT DOCUMENTS

| D. 332,455 | 1/1993 | Whetsel . | |
|---|---|---|---|
| 4,207,675 | * 6/1980 | Causey et al. | ................... 30/296.1 |
| 4,603,478 | * 8/1986 | Anderson | ............................. 30/276 |
| 4,607,431 | 8/1986 | Gay . | |
| 4,916,818 | * 4/1990 | Panek | ................................... 30/296.1 |
| 5,345,684 | 9/1994 | Shoup et al. . | |
| 5,423,126 | 6/1995 | Byrne . | |
| 5,560,108 | 10/1996 | Wilson . | |
| 5,774,993 | 7/1998 | Schlessmann . | |
| 5,940,973 | * 8/1999 | Kitz | ...................................... 30/296.1 |
| 6,065,214 | * 5/2000 | Nagashima | ............................. 30/276 |
| 6,182,367 | * 2/2001 | Janczak | ................................ 30/296.1 |

* cited by examiner

Primary Examiner—Hwei-Slu Payer

(57) ABSTRACT

A hedge trimmer assembly for trimming hedges and trees. The hedge trimmer assembly includes a head assembly comprising a rotatable trimmer head and a debris shield. A cutting line extending from the rotating head. A pole with the head assembly pivotably coupled to a first end of the pole. An adjustable head locking assembly for selectively locking the head assembly into a static position relative to the pole. A handle extending from the pole. A motor operationally coupled to the trimmer head. The motor is coupled to a second end of the pole. A trigger operationally coupled between the motor and the trimmer head.

15 Claims, 3 Drawing Sheets

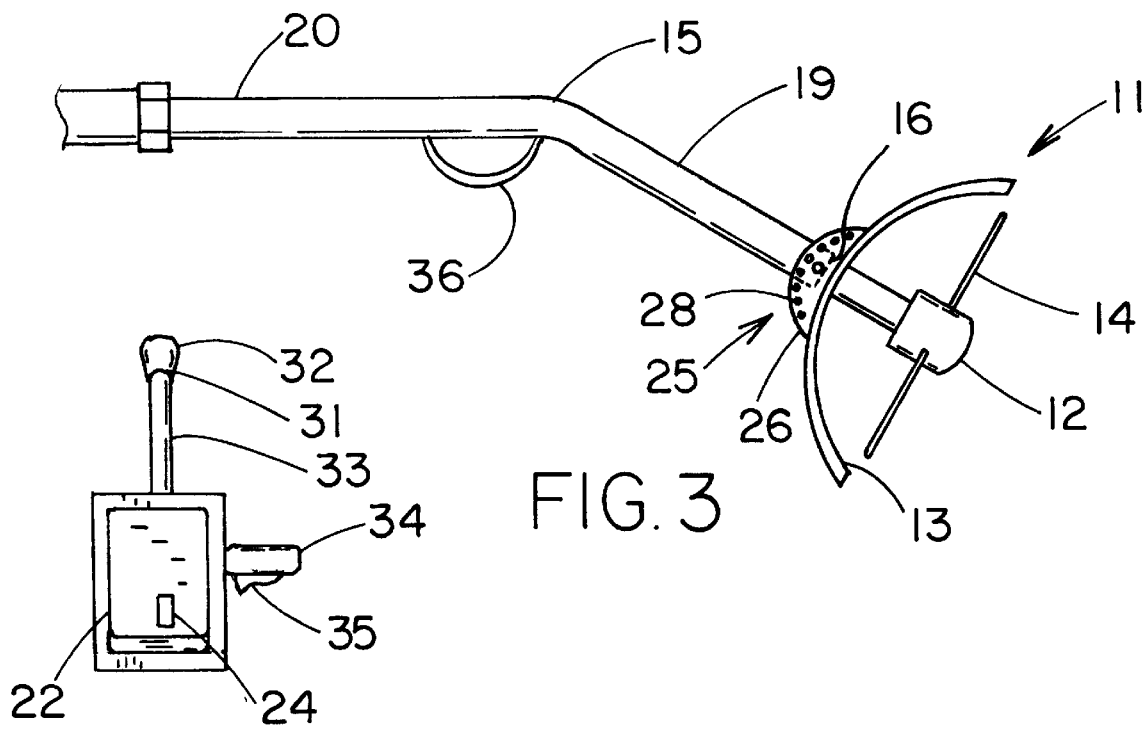
FIG. 3
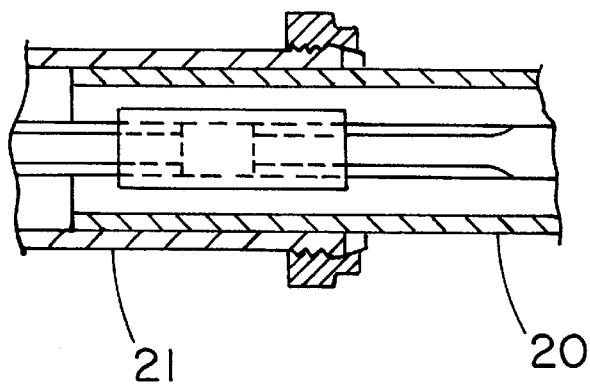
FIG. 4
FIG. 5

HEDGE TRIMMER ASSEMBLY

BACKGROUND OF THE INVENTION

1. Field of the Invention

The present invention relates to flexible line trimmers and more particularly pertains to a new hedge trimmer assembly for trimming hedges and trees.

2. Description of the Prior Art

The use of flexible line trimmers is known in the prior art. More specifically, flexible line trimmers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,560,108; 4,607,431; U.S. Pat. No. Des. 332,455; U.S. Pat. Nos. 5,345,684; 5,774,993; and 5,423,126.

While these devices fulfill their respective, particular objectives and requirements, the aforementioned patents do not disclose a new hedge trimmer assembly. The inventive device includes a head assembly comprising a rotatable trimmer head and a debris shield. A cutting line extending from the rotating head. A pole with the head assembly pivotably coupled to a first end of the pole. An adjustable head locking assembly for selectively locking the head assembly into a static position relative to the pole. A handle extending from the pole. A motor for rotating the trimmer head. The motor is coupled to a second end of the pole. A trigger operationally coupled between the motor and the trimmer head for selectively activating the trimmer head when the trigger is squeezed.

In these respects, the hedge trimmer assembly according to the present invention substantially departs from the conventional concepts and designs of the prior art, and in so doing provides an apparatus primarily developed for the purpose of trimming hedges and trees.

SUMMARY OF THE INVENTION

In view of the foregoing disadvantages inherent in the known types of flexible line trimmers now present in the prior art, the present invention provides a new hedge trimmer assembly construction wherein the same can be utilized for trimming hedges and trees.

The general purpose of the present invention, which will be described subsequently in greater detail, is to provide a new hedge trimmer assembly apparatus and method which has many of the advantages of the flexible line trimmers mentioned heretofore and many novel features that result in a new hedge trimmer assembly which is not anticipated, rendered obvious, suggested, or even implied by any of the prior art flexible line trimmers, either alone or in any combination thereof.

To attain this, the present invention generally comprises a head assembly comprising a rotatable trimmer head and a debris shield. A cutting line extending from the rotating head. A pole with the head assembly pivotably coupled to a first end of the pole. An adjustable head locking assembly for selectively locking the head assembly into a static position relative to the pole. A handle extending from the pole. A motor for rotating the trimmer head. The motor is coupled to a second end of the pole. A trigger operationally coupled between the motor and the trimmer head for selectively activating the trimmer head when the trigger is squeezed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hedge trimmer assembly apparatus and method which has many of the advantages of the flexible line trimmers mentioned heretofore and many novel features that result in a new hedge trimmer assembly which is not anticipated, rendered obvious, suggested, or even implied by any of the prior art flexible line trimmers, either alone or in any combination thereof.

It is another object of the present invention to provide a new hedge trimmer assembly which may be easily and efficiently manufactured and marketed.

It is a further object of the present invention to provide a new hedge trimmer assembly which is of a durable and reliable construction.

An even further object of the present invention is to provide a new hedge trimmer assembly which is susceptible of a low cost of manufacture with regard to both materials and labor, and which accordingly is then susceptible of low prices of sale to the consuming public, thereby making such hedge trimmer assembly economically available to the buying public.

Still yet another object of the present invention is to provide a new hedge trimmer assembly which provides in the apparatuses and methods of the prior art some of the advantages thereof, while simultaneously overcoming some of the disadvantages normally associated therewith.

Still another object of the present invention is to provide a new hedge trimmer assembly for trimming hedges and trees.

Yet another object of the present invention is to provide a new hedge trimmer assembly which includes a head assembly comprising a rotatable trimmer head and a debris shield. A cutting line extending from the rotating head. A pole with the head assembly pivotably coupled to a first end of the pole. An adjustable head locking assembly for selectively locking the head assembly into a static position relative to the pole. A handle extending from the pole. A motor for rotating the trimmer head. The motor is coupled to a second end of the pole. A trigger operationally coupled between the motor and the trimmer head for selectively activating the trimmer head when the trigger is squeezed.

Still yet another object of the present invention is to provide a new hedge trimmer assembly that is adjustable for greater precision while trimming.

Even still another object of the present invention is to provide a new hedge trimmer assembly that lighter and easier to control while trimming.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged side elevational view of the pole and head assembly of the present invention.

FIG. 4 is a rear elevational view of the present invention taken along line 4—4 of FIG. 2

FIG. 5 is a cross-sectional view of the present invention taken along line 5—5 of FIG. 2.

DESCRIPTION OF THE PREFERRED EMBODIMENT

Figure 1:
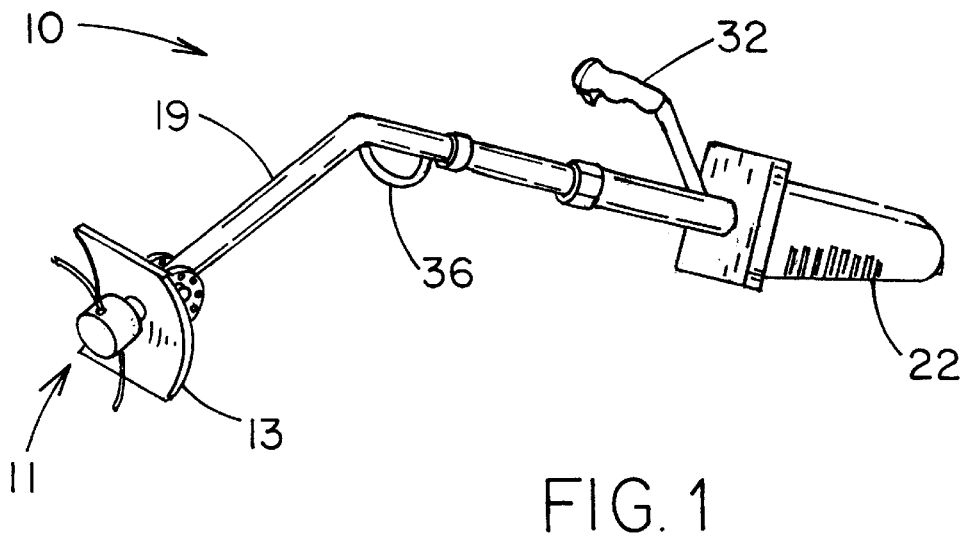
FIG. 1 is a perspective view of a new hedge trimmer assembly according to the present invention.
Figure 2:
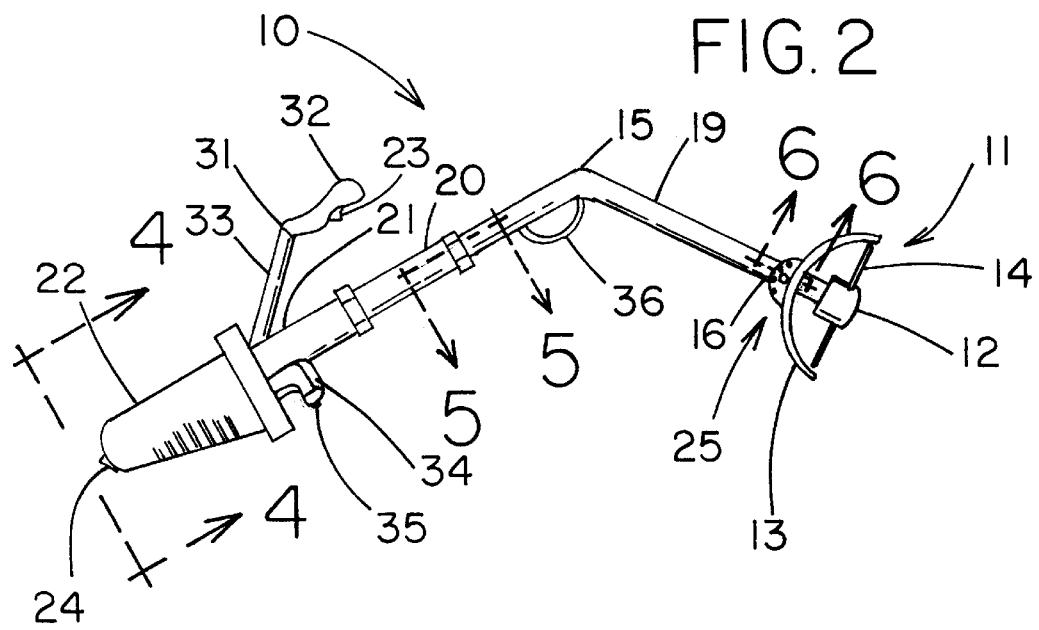
FIG. 2 is a side elevational view of the present invention.

With reference now to the drawings, and in particular to FIGS. 1 through 7 thereof, a new hedge trimmer assembly embodying the principles and concepts of the present invention and generally designated by the reference numeral 10 will be described.

As best illustrated in FIGS. 1 through 7, the hedge trimmer assembly 10 generally comprises a head assembly 11 including a rotatable trimmer head 12, a debris shield 13 and a cutting line 14 extending from the rotating head. The debris shield is arcuate and comprises outer ends. The outer ends lie in a plane in which the cutting line rotates when the trimmer head is activated.

A pole 15 has the head assembly pivotably coupled to a first end 16 thereof. The pole comprises a pivot hole 17 and a locking hole 18 proximate the first end. The pole comprises a bend in a medial portion of the pole to define a first portion 19 extending between the first end and the bend and a telescopic second portion 20 extending between a second end 21 and the bend.

A motor 22 is for rotating the trimmer head. The motor is coupled to the second end of the pole. A trigger 23 is operationally coupled between the motor and the trimmer head for selectively activating the trimmer head when the trigger is squeezed. The motor is chosen from the group of motors consisting of a DC electric motor, an AC electric motor, and a gas engine. A push button starting switch 24 may be operationally coupled to the motor to facilitate the starting of the motor.

Figure 6:
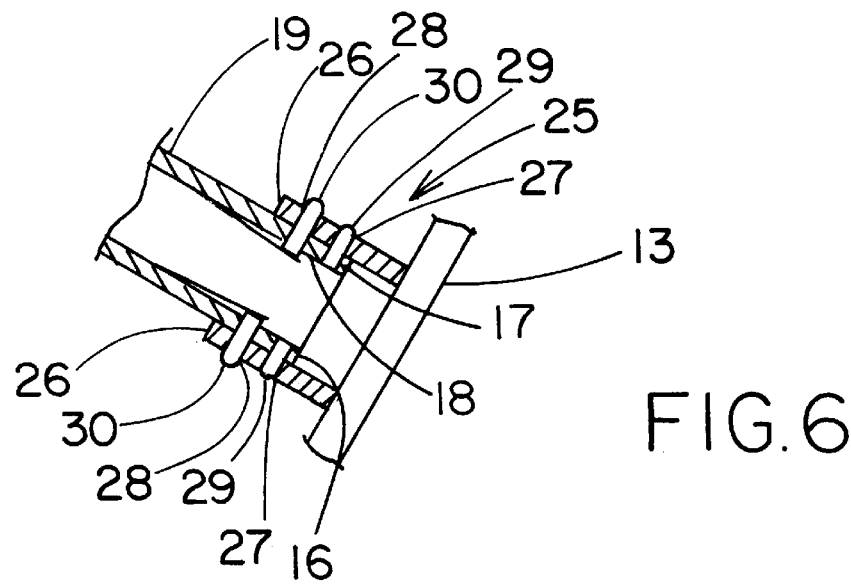
FIG. 6 is a cross-sectional view of the present invention taken along line 6—6 of FIG. 2.
Figure 7:
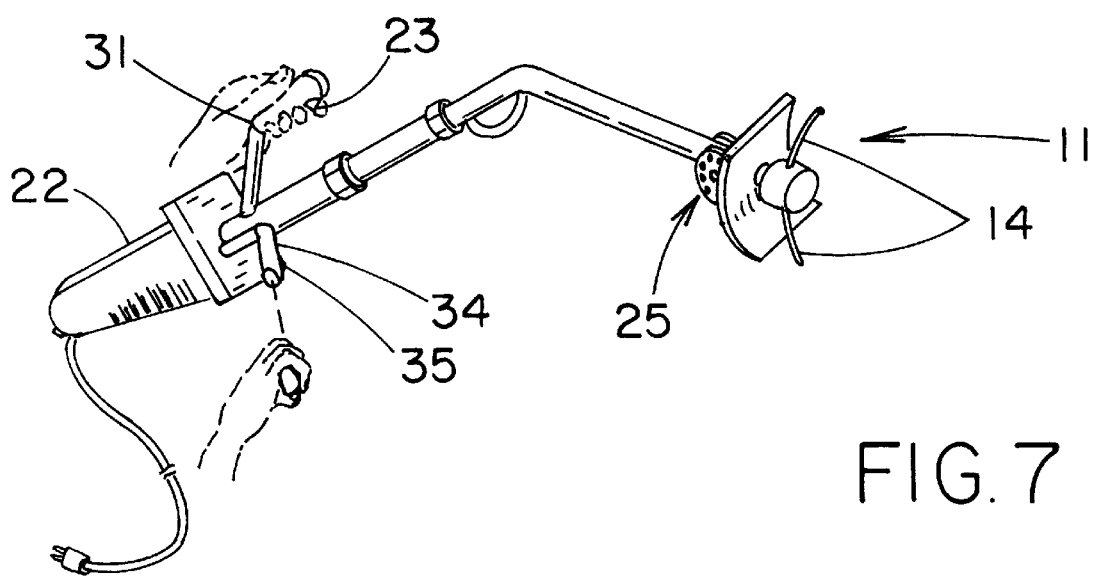
FIG. 7 is a perspective view of an embodiment of the present invention.

As shown in FIGS. 3 and 6, an adjustable head locking assembly 25 for selectively locking the head assembly into a static position relative to the pole. The head locking assembly includes a pair of generally parallel spaced walls 26 extending outwardly from a surface of the debris shield. Each of the walls comprise a pivot aperture 27 and a plurality of locking apertures 28. The locking apertures are positioned in spaced relationship to each other in an arcuate arrangement around the pivot aperture. The pivot apertures are aligned with the pivot hole of the pole. A pivot pin 29 is coupled to the walls and the pole such that the pivot pin is inserted through the aligned pivot apertures and the aligned pivot hole, whereby the head assembly is pivotable around the pivot pin. A locking pin 30 selectively couplable to the walls and the pole such that the locking pin extends through an aligned pair of the locking apertures and the locking hole in the pole whereby the head assembly is prevented from pivoting relative to the pole.

As shown in FIG. 1, a handle 31 extends from the pole. The trigger is located on the handle for permitting squeezing of the trigger by a user while gripping the handle. The handle comprises a gripping portion 32 extending orthogonally outward from a plane in which the first and second portions of the pole lie. The handle comprises an extension portion 33 extending between the gripping portion and the pole such that the gripping portion is offset from pole. A longitudinal axis of the gripping portion is parallel to a longitudinal axis of the second portion of the pole.

An alternate handle 34 extends outwardly from the pole for facilitating gripping and control of the hedge trimmer assembly during use. An alternate trigger 35 is operationally coupled between the motor and the trimmer head for selectively activating the trimmer head when the alternate trigger is squeezed. The alternate trigger is located on the alternate handle for permitting squeezing of the alternate trigger by a user while gripping the alternate handle.

An arcuate pole handle 36 extends outwardly from the pole proximate the bend. The pole handle is for facilitating positioning of the head assembly during use. The pole handle is coplanar with the first and second portions of the pole.

As to a further discussion of the manner of usage and operation of the present invention the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hedge trimmer assembly, comprising:
   a head assembly including a rotatable trimmer head and a debris shield;
   a cutting line extending from the rotatable trimmer head;
   a pole, the head assembly being pivotably coupled to a first end of the pole;
   an adjustable head locking assembly for selectively locking the head assembly into a static position relative to the pole;
   a first handle extending from the pole;
   a motor for rotating the rotatable trimmer head, the motor being coupled to a second end of the pole;
   a trigger operationally coupled between the motor and the rotatable trimmer head for selectively activating the rotatable trimmer head when the trigger is squeezed:
   said pole having a pivot hole and a locking hole proximate said first end;
   wherein said head locking assembly includes
      a pair of generally parallel spaced walls extending outwardly from a surface of said debris shield, each of said walls having a pivot aperture and a plurality of locking apertures, said locking apertures being positioned in spaced relationship to each other in an arcuate arrangement around said pivot aperture,
      said pivot apertures being aligned with said pivot hole of said pole,
      a pivot pin being coupled to said walls and said pole such that said pivot pin is inserted through said aligned pivot apertures and said aligned pivot hole, whereby said head assembly is pivotable around said pivot pin, and
      a locking pin, said locking pin being selectively couplable to said walls and said pole such that said locking pin extends through an aligned pair of said locking apertures and said locking hole in said pole whereby said head assembly is prevented from pivoting relative to said pole;
   said pole having a bend in a medial portion of said pole to define a first portion extending between said first end and said bend and a telescopic second portion extending between said second end and said bend;
   said motor being chosen from the group of motors consisting of a DC electric motor, an AC electric motor, and a gas engine;
   an alternate handle extending outwardly from said pole for facilitating gripping and control of the hedge trimmer assembly during use;
   said trigger being located on said first handle for permitting squeezing of said trigger by a user while gripping said first handle;
   an alternate trigger operationally coupled between the motor and the rotatable trimmer head for selectively activating the rotatable trimmer head when the alternate trigger is squeezed, said alternate trigger being located on said alternate handle for permitting squeezing of said alternate trigger by a user while gripping said alternate handle;
   an arcuate pole handle extending outwardly from said pole proximate said bend, said pole handle being for facilitating positioning of the head assembly during use;
   wherein said pole handle is coplanar with said first and second portions of said pole;
   said debris shield being arcuate and having outer ends said outer ends lying in a plane in which said cutting line rotates when said trimmer head is activated;
   said first handle having a gripping portion extending orthogonally outward from a plane in which said first and second portions of said pole lie; and
   said first handle having an extension portion extending between said gripping portion and said pole such that said gripping portion is offset from said pole.

2. A hedge trimmer assembly, comprising:
   a head assembly including a rotatable trimmer head and a debris shield;
   a cutting line extending from the rotatable trimmer head;
   a pole, the head assembly being pivotably coupled to a first end of the pole;
   an adjustable head locking assembly for selectively locking the head assembly into a static position relative to the pole;
   a handle extending from the pole;
   a motor for rotating the rotatable trimmer head, the motor being coupled to a second end of the pole;
   a trigger operationally coupled between the motor and the rotatable trimmer head for selectively activating the rotatable trimmer head when the trigger is squeezed.

3. The hedge trimmer assembly of claim 2, further comprising:
   said pole having a pivot hole and a locking hole proximate said first end; and
   wherein said head locking assembly includes
      a pair of generally parallel spaced walls extending outwardly from a surface of said debris shield, each of said walls having a pivot aperture and a plurality of locking apertures, said locking apertures being positioned in spaced relationship to each other in an arcuate arrangement around said pivot aperture;
      said pivot apertures being aligned with said pivot hole of said pole;
      a pivot pin being coupled to said walls and said pole such that said pivot pin is inserted through said aligned pivot apertures and said aligned pivot hole, whereby said head assembly is pivotable around said pivot pin; and
      a locking pin, said locking pin being selectively couplable to said walls and said pole such that said locking pin extends through an aligned pair of said locking apertures and said locking hole in said pole whereby said head assembly is prevented from pivoting relative to said pole.

4. The hedge trimmer assembly of claim 2, further comprising:
   said pole having a bend in a medial portion of said pole to define a first portion extending between said first end and said bend and a second portion extending between said second end and said bend.

5. The hedge trimmer assembly of claim 4, further comprising:
   an arcuate pole handle extending outwardly from said pole proximate said bend, said pole handle being for facilitating positioning of the hedge trimmer assembly during use.

6. The hedge trimmer assembly of claim 4, wherein said pole handle is coplanar with said first and second portions of said pole.

7. The hedge trimmer assembly of claim 4, further comprising:

said handle having a gripping portion extending orthogonally outward from a plane in which said first and second portions of said pole lie.

8. The hedge trimmer assembly of claim 7, further comprising:

said handle having an extension portion extending between said gripping portion and said pole such that said gripping portion is offset from pole.

9. The hedge trimmer assembly of claim 4, wherein said second portion of said pole is telescopic.

10. The hedge trimmer assembly of claim 2, further comprising:

said motor being chosen from the group of motors consisting of a DC electric motor, an AC electric motor, and a gas engine.

11. The hedge trimmer assembly of claim 2, further comprising:

an alternate handle extending outwardly from said pole for facilitating gripping and control of the hedge trimmer assembly during use.

12. The hedge trimmer assembly of claim 11, further comprising:

an alternate trigger operationally coupled between the motor and the rotatable trimmer head for selectively activating the rotatable trimmer head when the alternate trigger is squeezed, said alternate trigger being located on said alternate handle for permitting squeezing of said alternate trigger by a user while gripping said alternate handle.

13. The hedge trimmer assembly of claim 2, further comprising:

said trigger being located on said handle for permitting squeezing of said trigger by a user while gripping said handle.

14. The hedge trimmer assembly of claim 2, further comprising:

said debris shield being arcuate and having outer ends, said outer ends lying in a plane in which said cutting line rotates when said rotatable trimmer head is activated.

15. The hedge trimmer assembly of claim 2, wherein said pole is telescopic.

* * * * *